United States Patent
Kardos et al.

(10) Patent No.: US 10,081,138 B2
(45) Date of Patent: Sep. 25, 2018

(54) METHOD FOR PRODUCING A LUMINAIRE HOUSING

(71) Applicant: GE Lighting Solutions, LLC, East Cleveland, OH (US)

(72) Inventors: Péter Atilla Kardos, Budapest (HU); Veronika Varga, Budapest (HU); Glenn Howard Kuenzler, Brentwood, OH (US)

(73) Assignee: GE Lighting Solutions, LLC, East Cleveland, OH (US)

( * ) Notice: Subject to any disclaimer, the term of this patent is extended or adjusted under 35 U.S.C. 154(b) by 243 days.

(21) Appl. No.: 15/143,461

(22) Filed: Apr. 29, 2016

(65) Prior Publication Data

US 2017/0274596 A1    Sep. 28, 2017

Related U.S. Application Data

(63) Continuation-in-part of application No. 29/558,945, filed on Mar. 23, 2016, now Pat. No. Des. 782,101.

(51) Int. Cl.
*H01S 4/00* (2006.01)
*B29C 67/00* (2017.01)
(Continued)

(52) U.S. Cl.
CPC ........ *B29C 67/0088* (2013.01); *F21V 19/001* (2013.01); *B29L 2031/747* (2013.01);
(Continued)

(58) Field of Classification Search
CPC ............. F21Y 2101/00; F21Y 2107/40; F21Y 2107/00; Y10T 29/49002; B33Y 10/00; B33Y 50/02
(Continued)

(56) References Cited

U.S. PATENT DOCUMENTS

D40,388 S     12/1909   Lightbody
D215,558 S    10/1969   Schwartz
(Continued)

FOREIGN PATENT DOCUMENTS

DE    20 2014 003 324 U1    7/2014

OTHER PUBLICATIONS

Extended European Search Report and Opinion issued in connection with corresponding EP Application No. 17167848.5 dated Jul. 5, 2017.
U.S. Appl. No. 29/558,945, filed Mar. 23, 2016, Veronika Varga, et al.

*Primary Examiner* — Thiem Phan
(74) *Attorney, Agent, or Firm* — Peter T. DiMauro; GE Global Patent Operation

(57) ABSTRACT

A method for producing a luminaire housing on an additive manufacturing system includes selecting a luminaire housing base shape from which a data file of a first convex polyhedral model is built, rescaling the first convex polyhedral model into a larger convex polyhedral model, filling the larger convex polyhedral model with multiple versions of the first convex polyhedral model, separating larger convex polyhedral shape model into structural unit shape, and providing the data file containing the structural unit shapes to the additive manufacturing system. In some implementations an interior volume of the larger convex polyhedral shape model can be cleared of portions of first convex polyhedral model. The method includes the additive manufacturing system producing one or more structural units based on the structural unit shapes described in the electronic data file. A non-transitory computer readable medium, and a luminaire housing including a light source are described.

8 Claims, 10 Drawing Sheets

(51) Int. Cl.
*F21V 19/00* (2006.01)
*F21Y 101/02* (2006.01)
*B33Y 10/00* (2015.01)
*B33Y 50/02* (2015.01)
*B29L 31/00* (2006.01)

(52) U.S. Cl.
CPC ............... *B33Y 10/00* (2014.12); *B33Y 50/02* (2014.12); *F21Y 2101/02* (2013.01); *Y10T 29/49002* (2015.01)

(58) Field of Classification Search
USPC .......................................... 29/592.1, 428, 593
See application file for complete search history.

(56) References Cited

U.S. PATENT DOCUMENTS

| | | | |
|---|---|---|---|
| 5,623,790 A | 4/1997 | Lalvani | |
| 5,629,057 A * | 5/1997 | Wang | B44C 5/00 362/122 |
| D468,052 S | 12/2002 | Kitras | |
| 8,066,405 B2 * | 11/2011 | Simon | F21S 8/04 362/249.01 |
| D751,749 S | 3/2016 | Lovegrove | |
| D757,988 S | 5/2016 | Chang | |
| D771,300 S | 11/2016 | Micheli | |
| D782,101 S | 3/2017 | Varga et al. | |
| 2009/0086494 A1 | 4/2009 | Kenney | |
| 2016/0069622 A1 | 3/2016 | Alexiou et al. | |

\* cited by examiner

US 10,081,138 B2

METHOD FOR PRODUCING A LUMINAIRE HOUSING

CROSS-REFERENCE TO RELATED APPLICATION

This continuation-in-part application claims the benefit of priority under 35 U.S.C. § 119(e) to U.S. patent application Ser. No. 29/558,945, entitled "LUMINAIRE HOUSING", filed Mar. 23, 2016, which is herein incorporated in its entirety by reference.

BACKGROUND

Additive manufacturing (often referred to as "3D Printing"), is a process that can synthesize a three-dimensional (3D) object under computer control. Additive manufacturing can exceed conventional manufacturing technologies in the design complexity of devices that can be produced.

A digital file containing geometric data of the 3D object is provided to the control computer. This digital file describes the surface geometries of the 3D object. The control computer takes slices of the surface geometries, where each slice represents a thin layer of the overall 3D object. In some additive manufacturing technologies successive layers can be sequentially sputtered on the previous layer to build up the 3D object. Additive manufacturing can be implemented using a variety of technologies and from an array of materials depending on the specific technology. These materials include, but are not limited to, thermoplastics, rubbers, clays, ceramic, polycarbonate, photopolymer, and metal alloys.

DETAILED DESCRIPTION

In accordance with embodiments, a luminaire housing is assembled from part(s) created by an additive manufacturing technology. Due to the complexity of the luminaire housing's appearance, it cannot be produced in a cost effective manner by conventional manufacturing technologies and equipment.

Figure 1A:
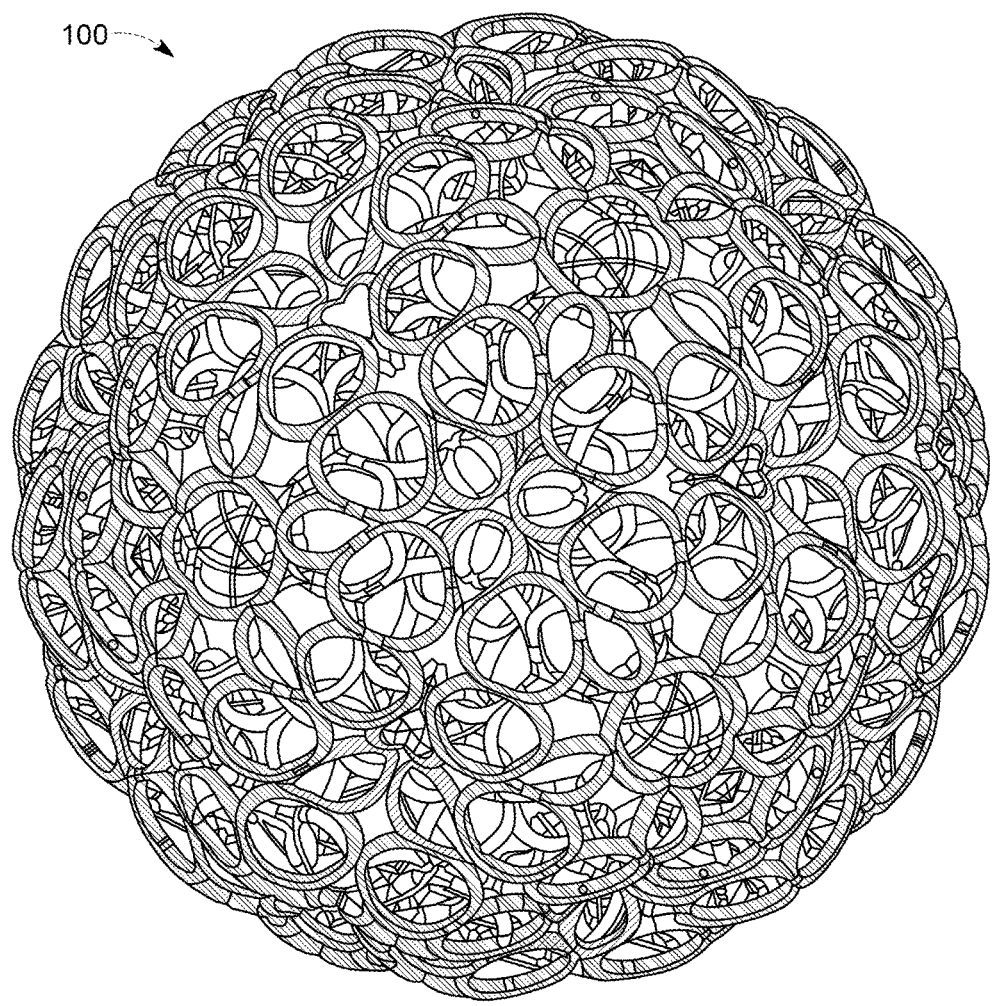
FIGS. 1A-1B depict a perspective view of a luminaire housing in accordance with embodiments.
Figure 1B:
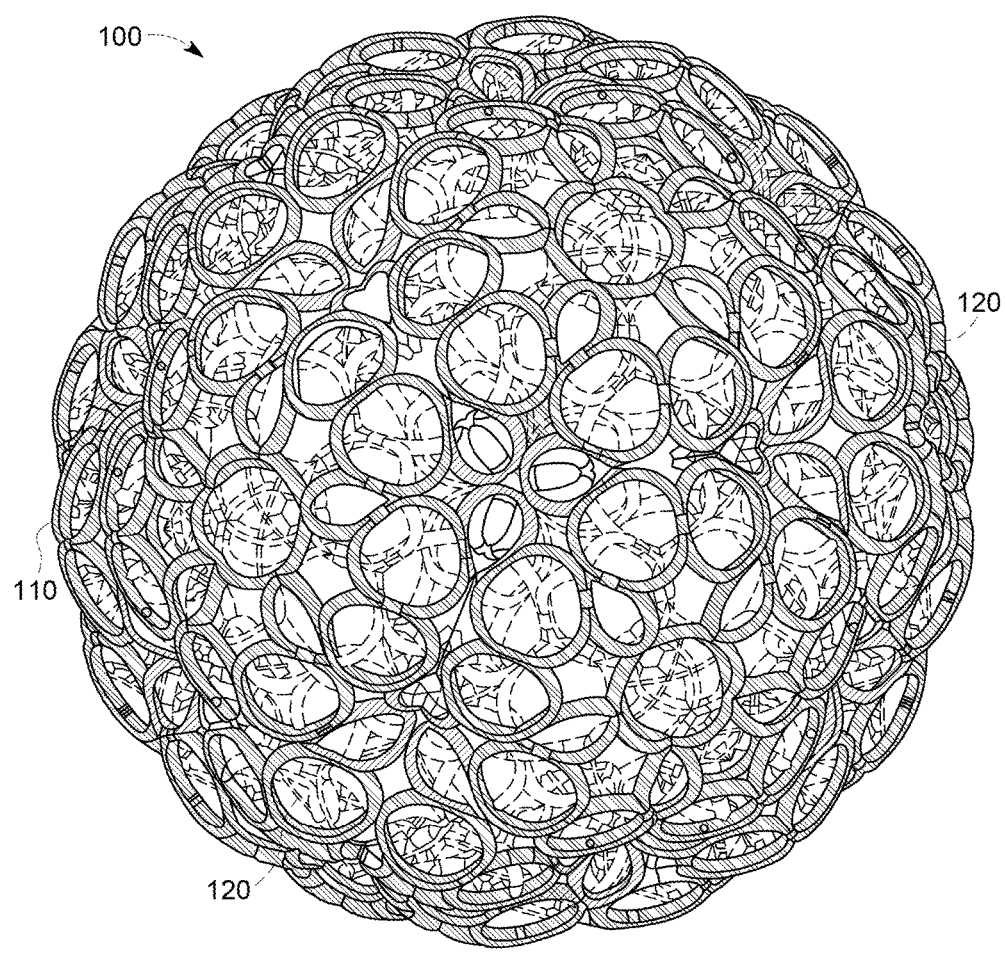

FIGS. 1A-1B depict a perspective view of luminaire housing 100 in accordance with an embodiment. The shape of the luminaire housing can be based on a convex polyhedral shape. For purposes of this disclosure, luminaire housing 100 is based on a truncated icosahedron. Luminaire housing 100, as illustrated, is about spherical in shape. However, the invention is not so limited and other geometric shapes (square, rectangular, triangular, polygon, etc.) are within the scope of this disclosure. An embodying luminaire housing includes outer surface 110, produced by assembling multiple structural units. In accordance with embodiments, each of these structural units is created by an additive manufacturing process. The structural units include members 120, located within an interior volume defined by outer surface 110. For purposes of clarity, members 120 are shown in dashed lines in FIG. 1B.

Figure 2A:
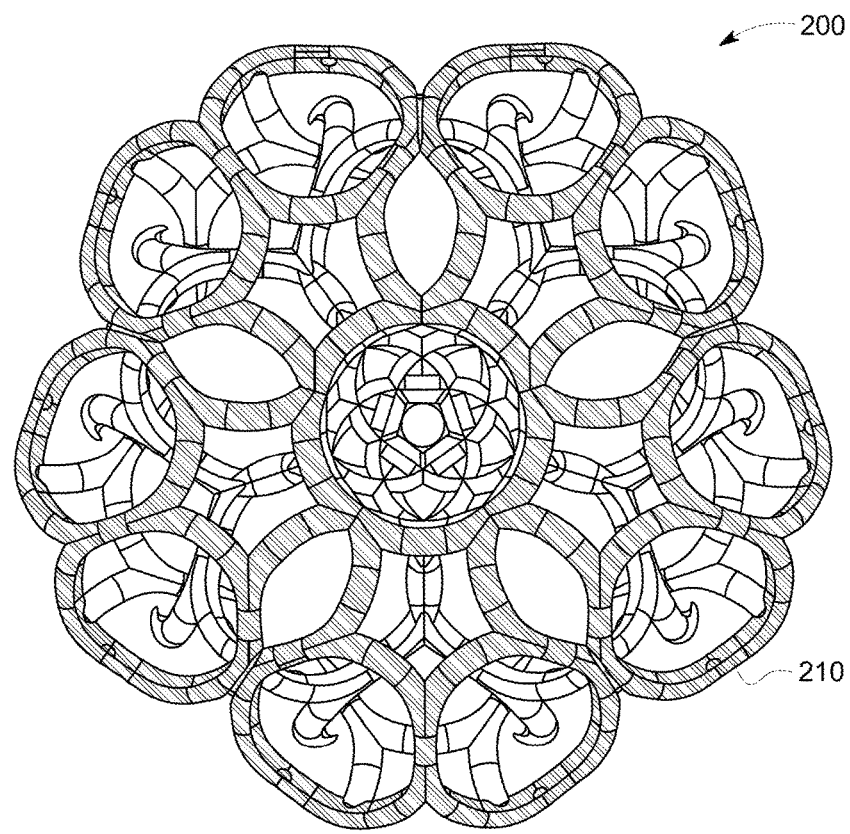
FIG. 2A depicts a top perspective view of a structural unit of the luminaire housing of FIGS. 1A-1B in accordance with embodiments.
Figure 2B:
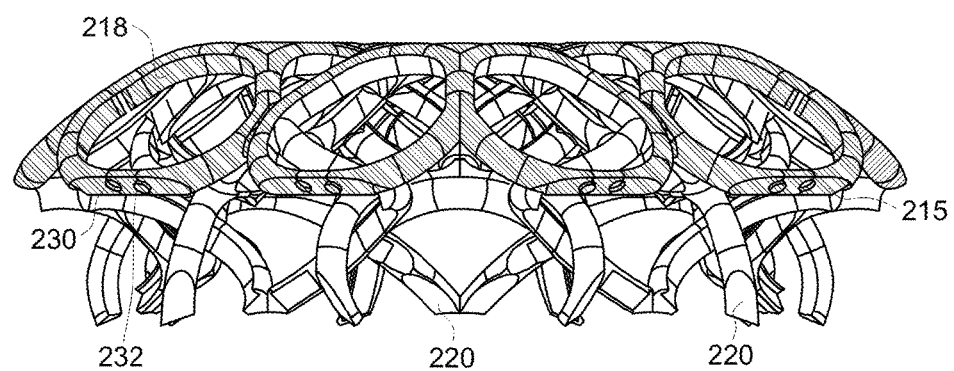
FIG. 2B depicts a side perspective view of the structural unit of FIG. 2A in accordance with embodiments.

In accordance with an embodiment, the luminaire housing can be assembled from two styles of structural members that are produced by an additive manufacturing process. It should be readily understood that other embodiments can be assembled from one style, or more than two styles, of structural members. FIGS. 2A-2B depict, respectively, top and side perspective views of first structural unit 200 of the luminaire housing in accordance with embodiments. First structural unit 200 includes outer surface 210 and members 220 located distal from outer surface 210. Sidewall 215 of the first structural unit can include protrusion 230 and receptacle 232. The protrusion and receptacle can mate with corresponding protrusions and receptacles of adjoining structural members.

Figure 3A:
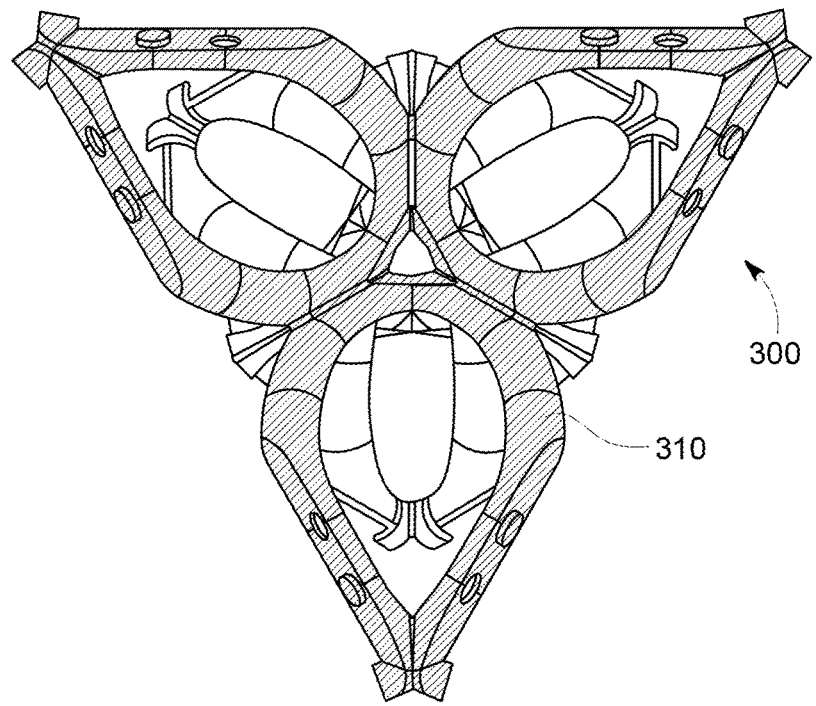
FIG. 3A depicts a top perspective view of another structural unit of the luminaire housing of FIGS. 1A-1B in accordance with embodiments.
Figure 3B:
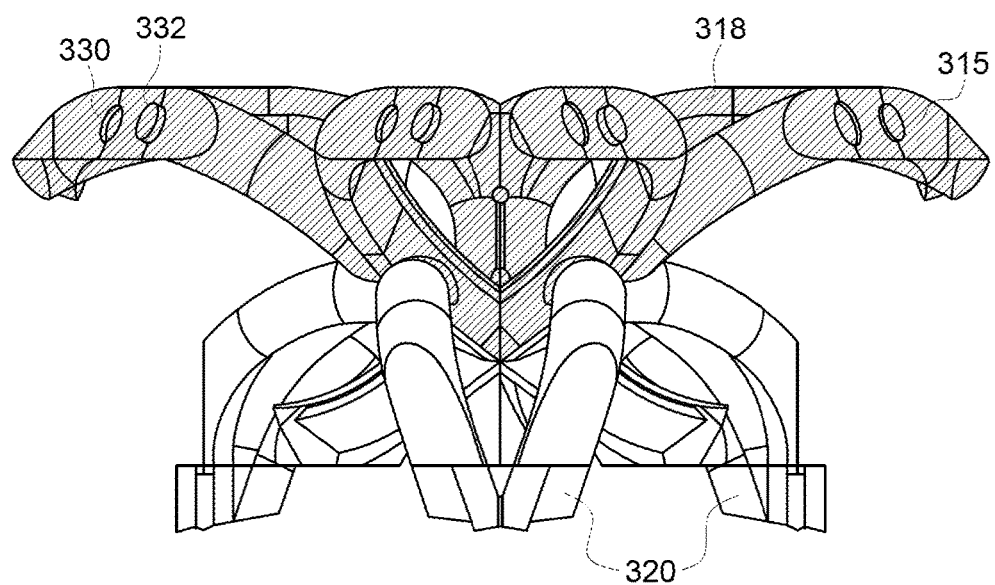
FIG. 3B depicts a side perspective view of the structural unit of FIG. 3A in accordance with embodiments.

FIGS. 3A-3B depict, respectively, top and side perspective views of second structural unit 300 of the luminaire housing in accordance with embodiments. Second structural unit 300 includes outer surface 310 and members 320 located distal from outer surface 310. Sidewall 315 of the second structural unit can include receptacle 330 and protrusion 332. The protrusion and receptacle can mate with corresponding protrusions and receptacles of adjoining structural members.

In accordance with the depicted embodiment, luminaire housing 100 is formed from first and second structural units. However, the invention is not so limited as to require a first structural unit and a second structural unit. It should be readily understood that dependent on the geometric shape of the luminaire housing, it can be assembled from multiple structural units having an identical shape, or from three or more multiple structural units. The appearance and form of these structural units can vary from the embodiments depicted in FIGS. 2A-2B and 3A-3B.

Figure 4:
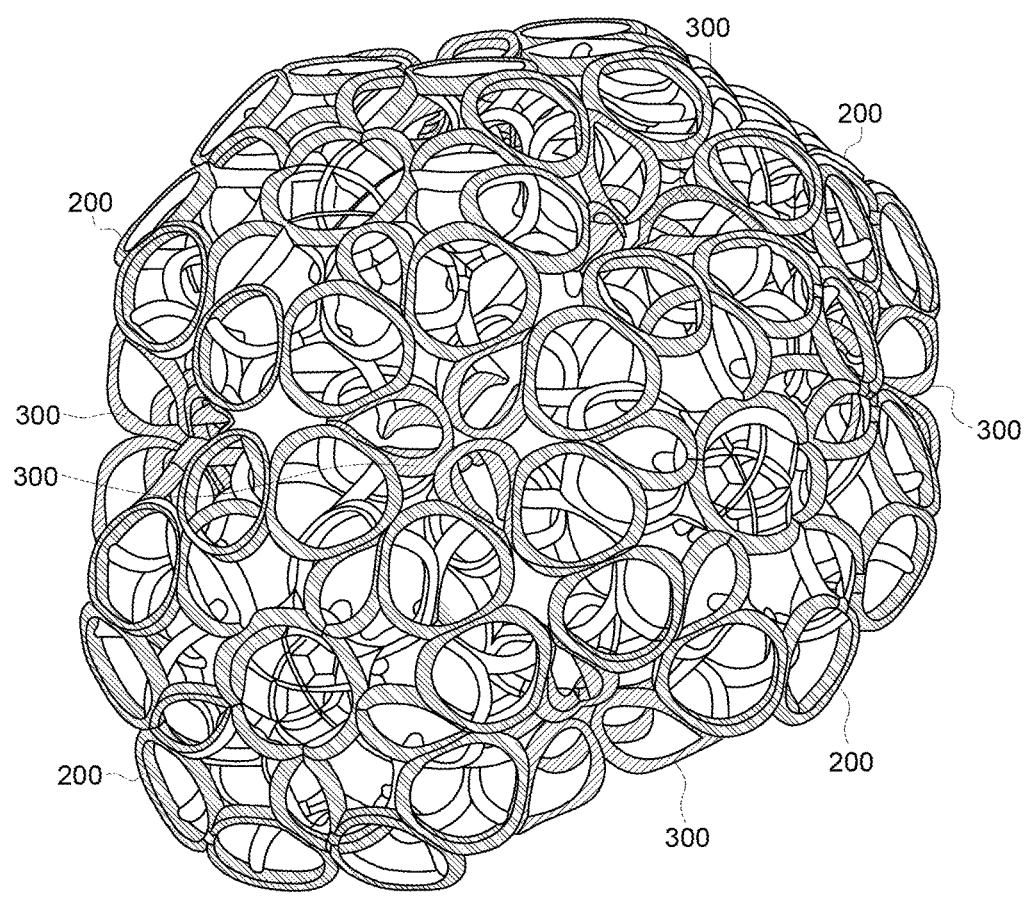
FIG. 4 depicts a partially assembled luminaire housing of FIGS. 1A-1B in accordance with embodiments.

FIG. 4 depicts a partially assembled luminaire housing in accordance with embodiments. This partially assembled luminaire housing includes multiple first structural units 200 that are joined together by multiple second structural units 300.

Figure 5A:
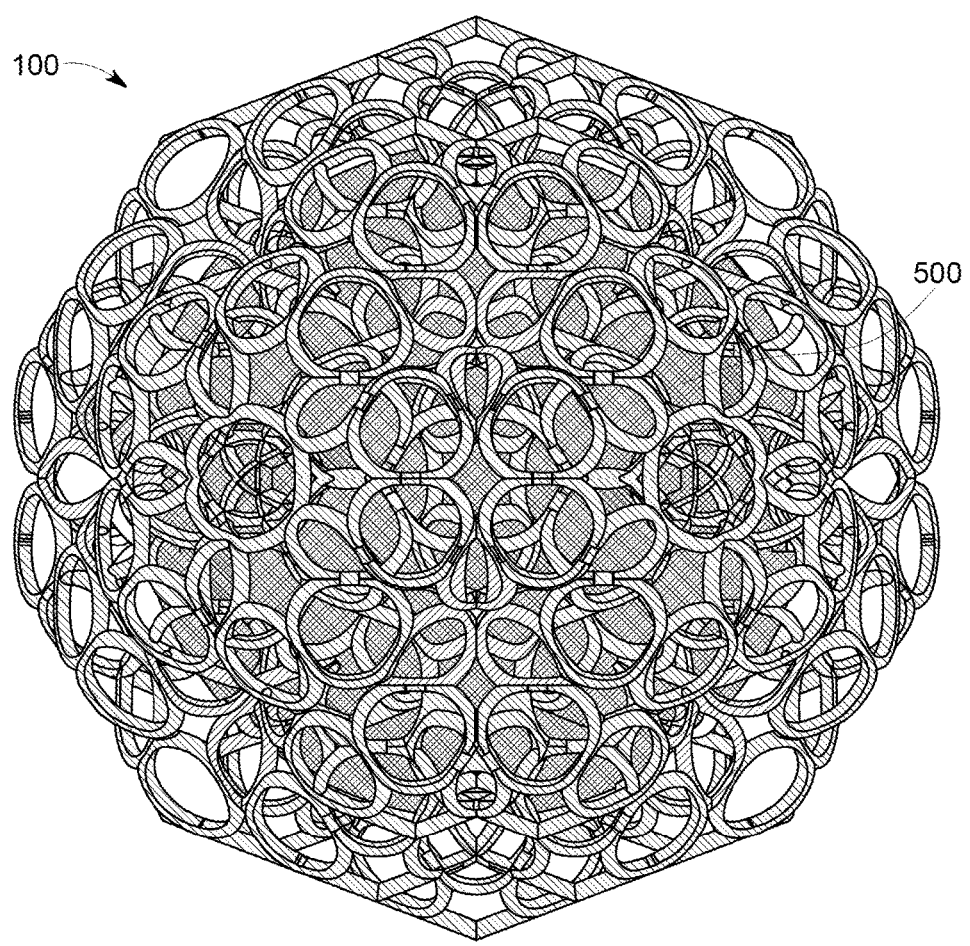
FIG. 5A depicts the luminaire housing of FIGS. 1A-1B with an internal light source in accordance with embodiments.

In accordance with embodiments, luminaire housing 100 can include a light source. FIG. 5A depicts luminaire housing 100 with internal light source 500 in accordance with embodiments. Light source 500 can be any light source (e.g., light emitting diode (LED), incandescent, fluorescent, high intensity discharge, etc.). The light source can be placed within the interior volume of the luminaire housing during the assembly of the structural members.

Figure 5B:
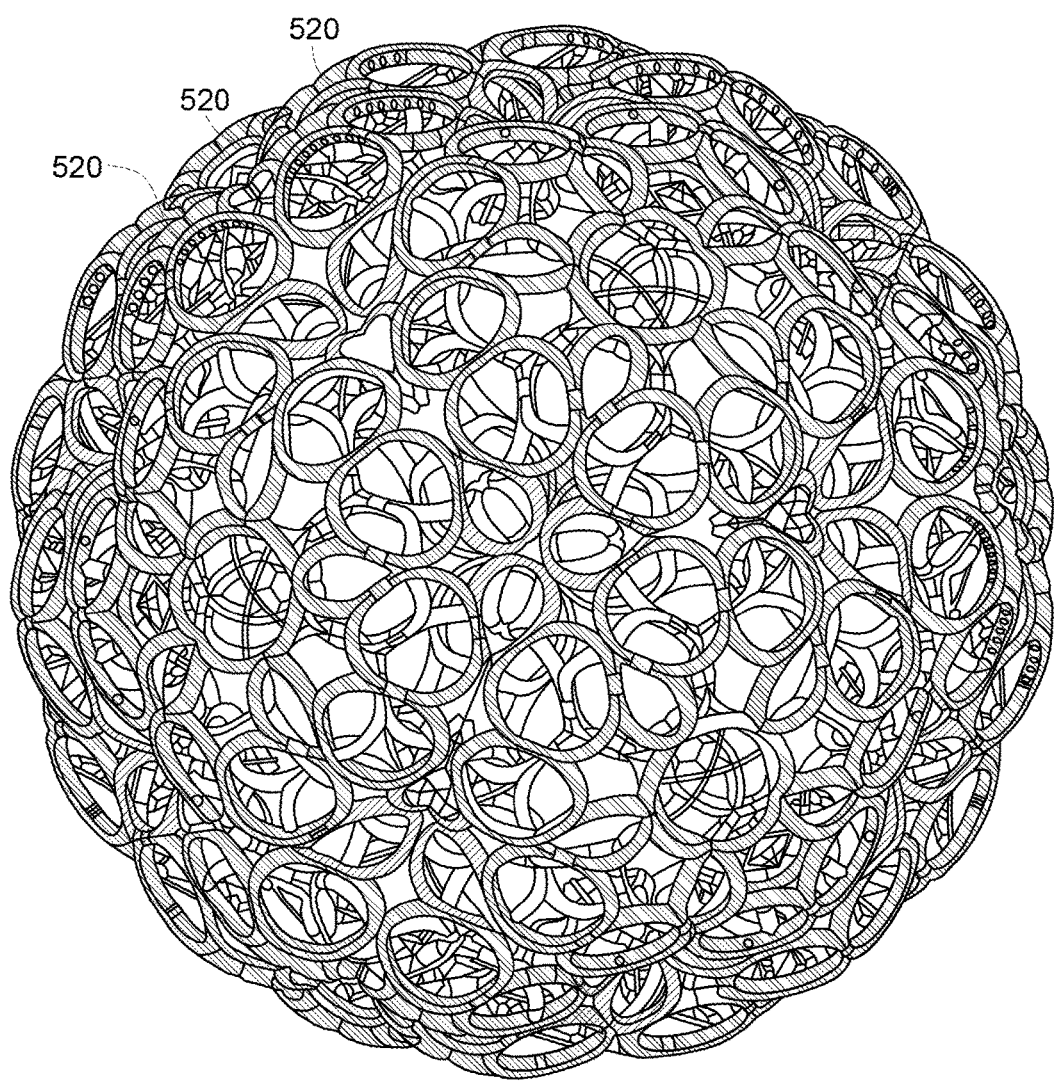
FIG. 5B depicts the luminaire housing of FIGS. 1A-1B with LED light sources in accordance with embodiments.

FIG. 5B depicts luminaire housing 100 with LED light sources 520 located on sidewall 218 (FIG. 2B) of outer surface 210, and/or sidewall 318 (FIG. 3B) of outer surface 310, in accordance with embodiments. In some implementations, grooves can be fabricated in the sidewall during the additive manufacturing process to accommodate the LED light sources.

Figure 6A:
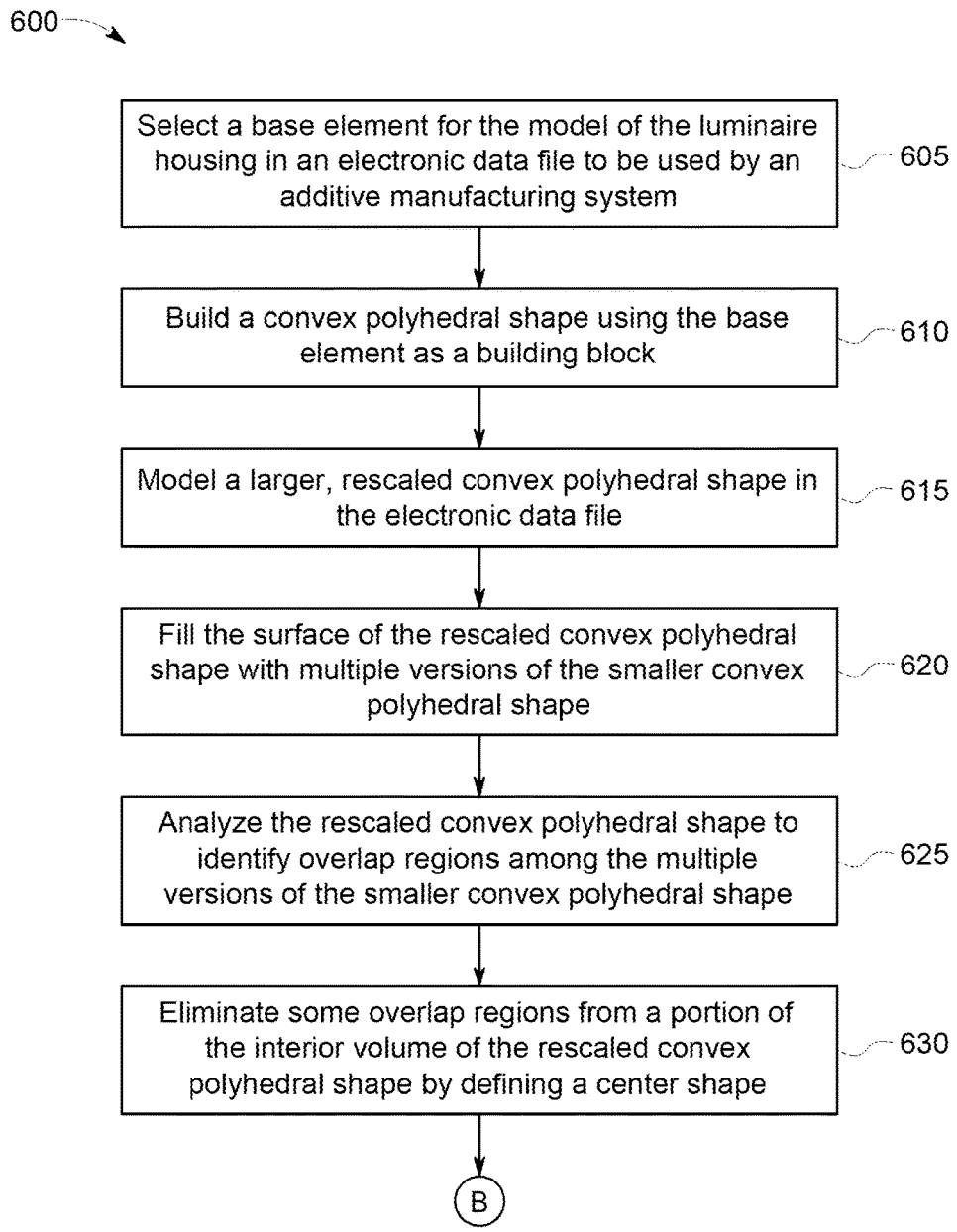
FIGS. 6A-6B depict an additive manufacturing process for producing the luminaire housing of FIGS. 1A-1B in accordance with embodiments.
Figure 6B:
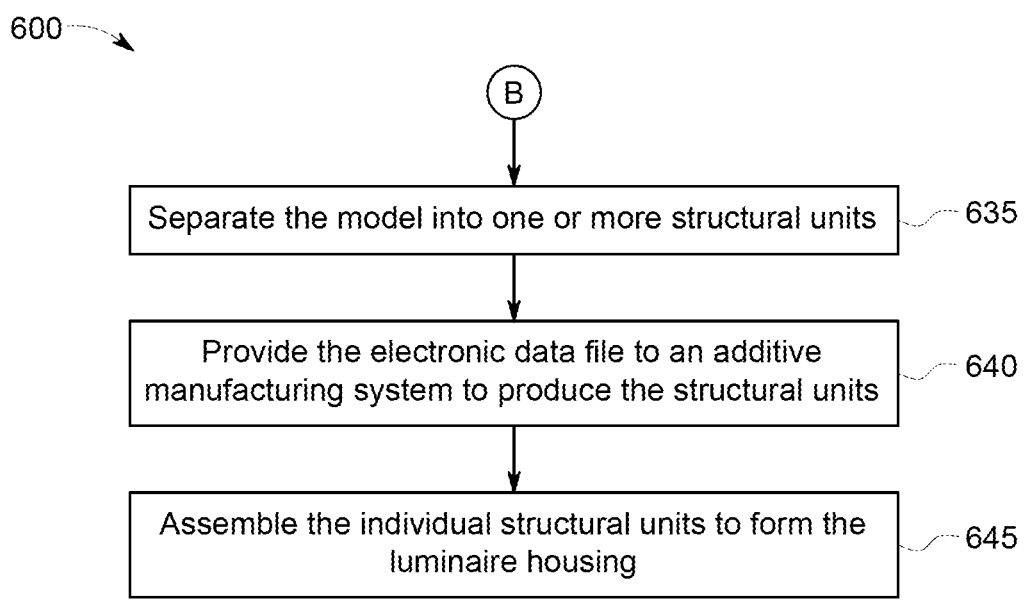
Figure 7:
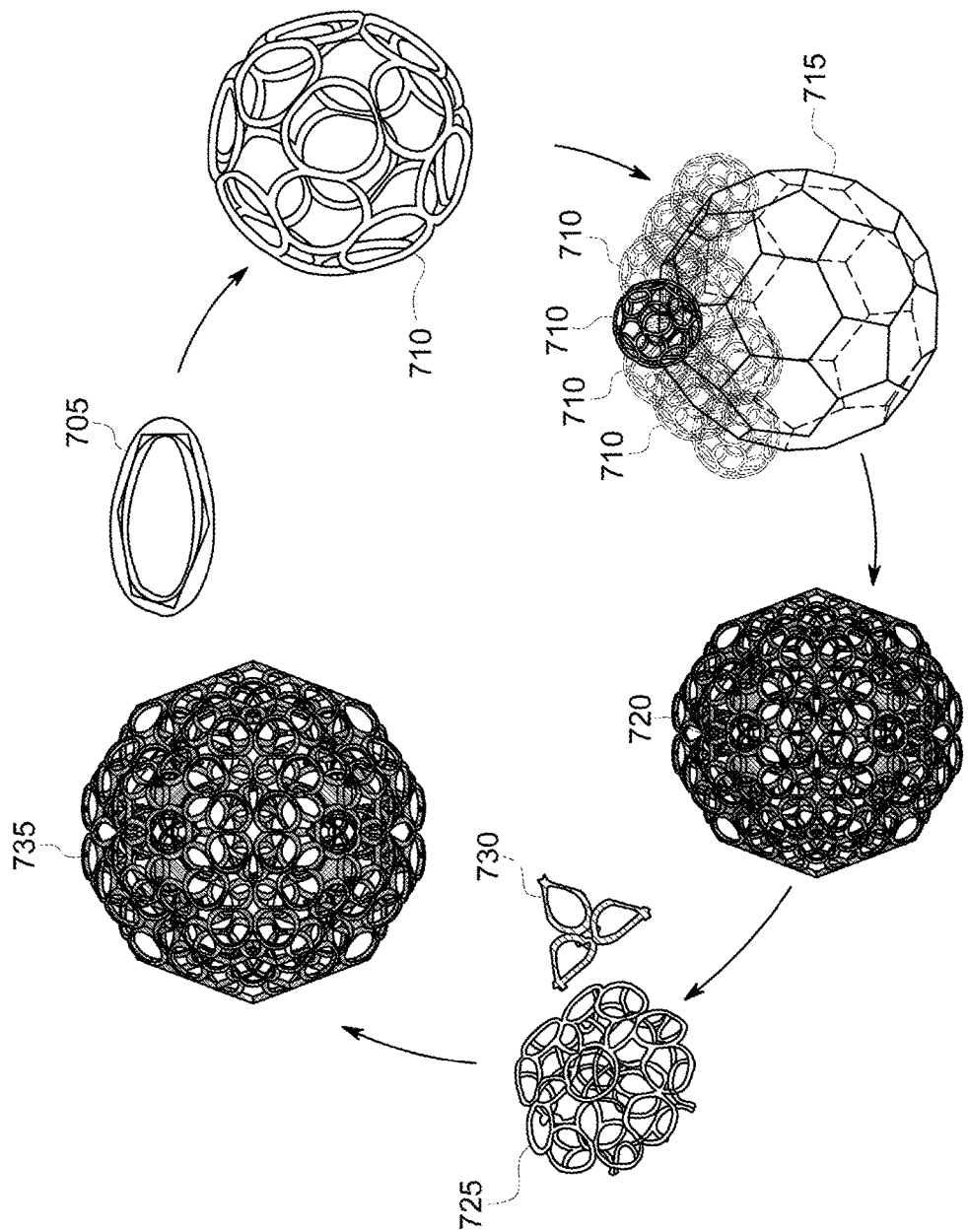
FIG. 7 pictorially depicts various stages of the process depicted in FIGS. 6A-6B.

FIGS. 6A-6B depict additive manufacturing process 600 for producing luminaire housing 100 in accordance with embodiments. FIG. 7 depicts pictorially various stages of the process depicted in FIG. 6. At step 605, a base element for the luminaire housing is selected by a user creating an electronic data file. In the depicted embodiment of FIG. 7, because the luminaire housing is to be about spherical, base element 705 is selected to be circular.

The user can make the base element selection via a user interface of an additive manufacturing system. The additive manufacturing system can include a central controller, or processor, controlling an additive manufacturing printer. In other approaches, the user can make the selection at a computer aided design (CAD), or other, drawing system capable of generating the electronic data file for use by the additive manufacturing system.

From the base element, convex polyhedral shape 710 (e.g., a truncated icosahedron) is built in an electronic data file using the base element as the building block, step 610. For the illustrated spherical luminaire housing, the convex polyhedral shape could have the appearance of a soccer ball. A rescaled convex polyhedral shape 715 is modeled in the electronic data file, step 615. This rescaled shape is based on the shape of convex polyhedral 710, but larger.

The surface of rescaled convex polyhedral shape 715 is filled, step 620, with multiple versions of the smaller convex polyhedral shape 710. The multiple versions of convex polyhedral shapes 710 are placed (see FIG. 7) in the corners of rescaled convex polyhedral 715 to define the region which will result in luminaire housing 100.

After the surface of rescaled convex polyhedral shape 715 is filled, in some implementations the model can be analyzed, step 625, under processor control to determine an interior volume of the model that is to be cleared of a predefined center shape 720 (e.g., a sphere or other geometric shape). Predefined center shape 720 is a theoretical boundary which determines the thickness of the actual luminaire housing. In some embodiments, this interior volume can contain a light source, so a spherical shape is a practical choice to accommodate a diffuser for the light source.

Those portions of the multiple versions of convex polyhedral shapes 710 occupying the space within center shape 720 are removed, step 630, from the model. The remaining portions of the multiple versions of the smaller convex polyhedral shape describe the outer surface (e.g., outer surface 110) and the interior members (e.g., members 120) of the luminaire housing.

The model is then separated, step 635, into structural units. As noted above, the structural units can be the same shape, or multiple shapes. For example, the illustrated embodiment includes two structural shapes 725, 730 (e.g., first structural unit 200 and second structural unit 300). The electronic data file can then be used to produce, step 640, the structural shapes on the additive manufacturing system. The individual structural elements are assembled, step 645, to form luminaire housing 735.

In accordance with embodiments, during the assembly of the structural elements, a light source can be located within the interior volume of the luminaire housing. In other implementations, a groove can be produced in a sidewall of the structural elements, and LED light sources can be located within these sidewalls.

A luminaire housing constructed in accordance with additive manufacturing process 600 can produce a one-of-a-kind design. The uniqueness of the design can make an artistic statement that is not economically achievable by conventional techniques at production quantity levels.

In accordance with some embodiments, a computer program application stored in non-volatile memory, computer-readable medium (e.g., register memory, processor cache, RAM, ROM, hard drive, flash memory, CD ROM, magnetic media, etc.), and/or external memory may include code or executable instructions that when executed may instruct and/or cause a controller or processor to perform methods discussed herein including an additive manufacturing process for producing a luminaire housing, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method for producing a luminaire housing on an additive manufacturing system, the method comprising:
   selecting a base element for the shape of the luminaire housing;
   building, in an electronic data file, a first model of a convex polyhedral shape using the base element as a building block;
   rescaling the first convex polyhedral shape model into a second model of a convex polyhedral shape, the second convex polyhedral shape model being larger than the first convex polyhedral shape model;
   filling the second convex polyhedral shape model with multiple versions of the first convex polyhedral shape model;
   separating the second convex polyhedral shape model into structural unit shapes; and
   providing the electronic data file containing the structural unit shapes to the additive manufacturing system.

2. The method of claim 1, including producing by the additive manufacturing system one or more structural units based on the structural unit shapes described in the electronic data file.

3. The method of claim 2, including assembling the structural units to form the luminaire housing.

4. The method of claim 3, including positioning a light source within an interior volume of the luminaire housing.

5. The method of claim 3, including positioning a light emitting diode light source along a sidewall of one or more of the structural units.

6. The method of claim 1, including the steps of:
analyzing the filled second convex polyhedral shape model to determine an interior volume of the model that is to be cleared of a predefined center shape; and
removing from the second convex polyhedral shape portions of the multiple versions of the first convex polyhedral shape model that occupy the same volume as the predefined center shape.

7. The method of claim 6, including selecting the center shape size based on a predetermined thickness of the luminaire housing.

8. The method of claim 1, wherein the convex polyhedral shape is a truncated icosahedron shape.

\* \* \* \* \*